United States Patent [19]

Rubey

[11] Patent Number: 4,970,748
[45] Date of Patent: Nov. 20, 1990

[54] APPARATUS FOR CLEANING MAGNETIC TAPE

[75] Inventor: Ulyss R. Rubey, Graham, Tex.

[73] Assignee: Media Recovery, Inc., Dallas, Tex.

[21] Appl. No.: 368,262

[22] Filed: Jun. 19, 1989

[51] Int. Cl.$^5$ .............................................. B08B 11/02
[52] U.S. Cl. ...................................... 15/97.1; 15/100; 360/137; 242/197
[58] Field of Search ................ 15/97 R, 100; 360/137

[56] References Cited

U.S. PATENT DOCUMENTS

| | | | |
|---|---|---|---|
| 4,635,876 | 1/1987 | Hosilyk et al. | 15/100 X |
| 4,637,088 | 1/1987 | Badaracco et al. | 15/97 R |
| 4,713,857 | 12/1987 | Cecil et al. | 15/97 R |

Primary Examiner—Edward L. Roberts
Attorney, Agent, or Firm—Geoffrey A. Mantooth; James C. Fails

[57] ABSTRACT

An apparatus for automatically cleaning magnetic tape in a cartridge, and in particularl a 3480 type cartridge, has a cartridge nest for receiving and retaining the cartridge, a rotatable take-up hub, a load arm, cleaning apparatus and control apparatus. The load arm swings between a first position, where the arm engages the cartridge load block, and a second position, where the arm and the load block are at the take-up hub. In moving from the first to the second position, the load arm strings the tape through the cleaning apparatus. The cleaning apparatus has tissues for wiping the tape and a scraper for scraping the oxide surface of the tape. The tape is cleaned as it is wound out to the take-up hub and also as it is rewound into the cartridge. The control apparatus provides automatic operation of the load arm, and the wind out and rewind operations.

18 Claims, 9 Drawing Sheets

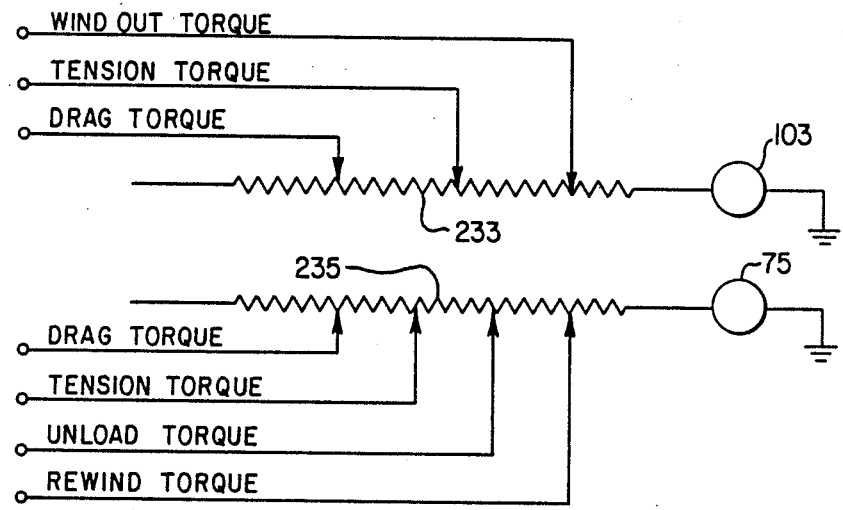
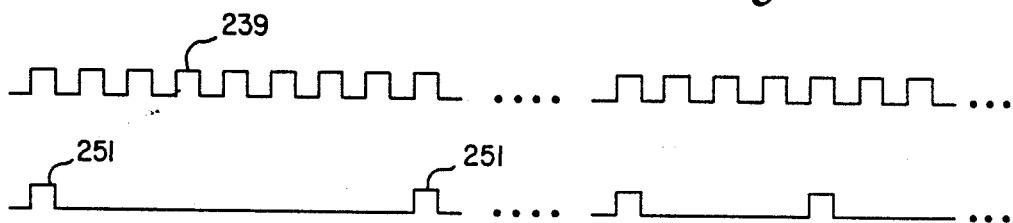
Fig. 10
Fig. 12
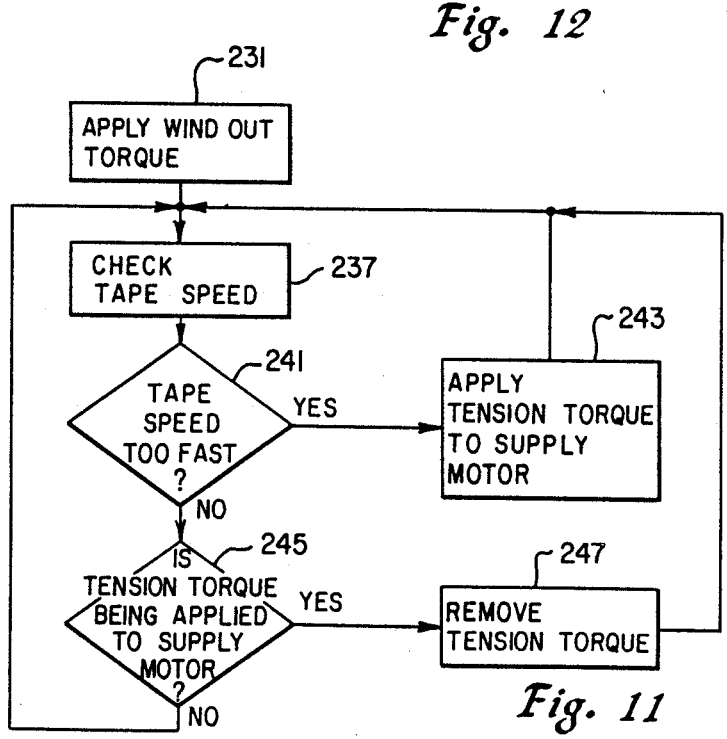
Fig. 11

4,970,748

APPARATUS FOR CLEANING MAGNETIC TAPE

FIELD OF THE INVENTION

The present invention relates to apparatuses for cleaning magnetic tape, which tapes can be used to store digital data thereon, and in particular, to apparatuses for cleaning magnetic tape stored in cartridges.

BACKGROUND OF THE INVENTION

Magnetic tape provides a good mass storage device for storing large quantities of computer data. In the prior art, the most common type of magnetic tape storage unit uses reels of magnetic tape. Newer types of magnetic tape storage units utilize magnetic tape cartridges. One type of tape cartridge in particular is referred to in the industry as a 3480 cartridge. The 3480 tape cartridge is becoming more and more popular because it has a higher storage density than other tape devices and it lends itself to robotic handling. The 3480 tape cartridge contains a single spool of tape. The free end of the tape is coupled to a load block. When the cartridge is used, the load block is transferred to a take-up spool external to the cartridge. The cartridge contains a locking mechanism that must be disengaged before the tape can be wound or unwound from the cartridge.

Magnetic tape, particularly high density magnetic tape, must be periodically cleaned to satisfactorily maintain its data storage capability. Debris and high spots on the tape prevent good tape-to-head contact, resulting in a loss of some data.

As with any other magnetic tape, the tape in a 3480 cartridge must be periodically cleaned. Automatic cleaning the tape in a 3480 cartridge is made difficult by the structure of the cartridge. For example, the locking mechanism must be disengaged to allow the tape to be unwound for cleaning. Furthermore, the load block must be manipulated to remove the tape from the cartridge. Further still, the length of tape in a 3480 cartridge can vary from between 450 to 600 feet. The tape has no markers to indicate its beginning or end and the end of the tape is not physically coupled to the cartridge. Thus, when the tape is unwound from the cartridge for cleaning, some tape must be left on the cartridge spool, otherwise the end of the tape will be removed from the cartridge.

It is an object of the present invention to provide an apparatus for automatically cleaning tape in magnetic tape cartridges in general, and in particular, for automatically cleaning magnetic tape cartridges of the 3480 type.

It is another object of the present invention to provide an apparatus that can detect the approach of the end of the tape so as not to remove all of the tape from the cartridge.

It is a further object of the present invention to provide an apparatus for automatically cleaning tape in cartridges wherein the tape is rewound into the cartridge under a constant tension.

BRIEF DESCRIPTION OF THE DRAWINGS

FIG. 10 is an electrical schematic diagram of the speed control circuits for the supply and take-up motors.

FIG. 11 is a flow diagram showing the operational steps in controlling the tape speed during wind out and rewind.

FIG. 12 is a schematic diagram showing electrical pulses produced by the second tape guide sensor and by a motor hub sensor.

DESCRIPTION OF PREFERRED EMBODIMENT

Figure 1:
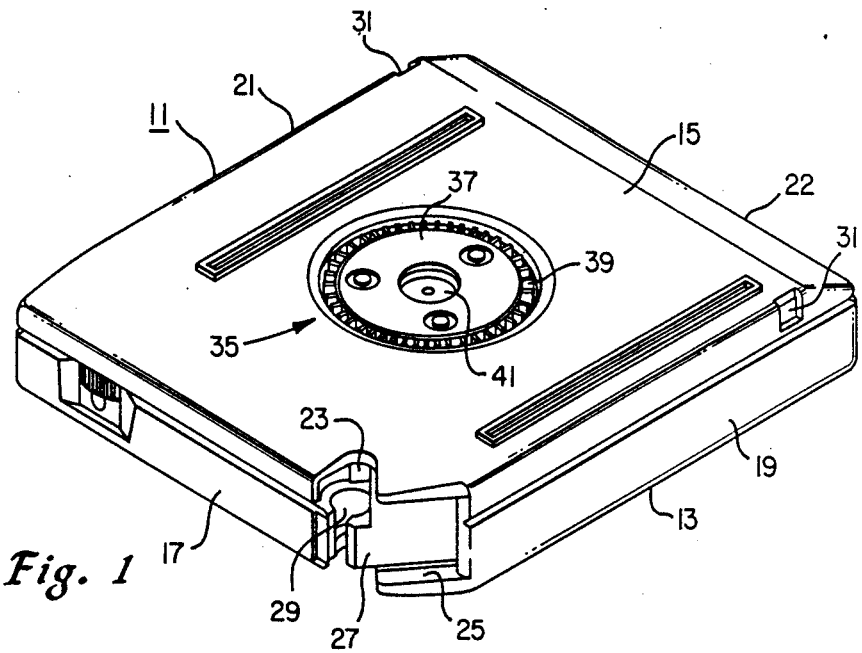
FIG. 1 is an isometric view of a 3480 type of magnetic tape cartridge, showing the locking mechanism.

The apparatus of the present invention is designed to clean the magnetic tape contained in a conventional 3480 tape cartridge 11. Referring to FIG. 1, the 3480 cartridge 11, which is used for storing digital computer data, has a spool (not shown) around which is wound the magnetic tape. The tape spool is surrounded by a rectangular enclosure having top and bottom walls 13, 15 and side walls 17, 19, 21, 22. The enclosure side walls include a front wall 17, first, and second side walls 19, 21 and a back wall 22. In one of the corners of the enclosure is a port 23 for allowing the passage of the tape in and out of the cartridge. The port is located in a recess 25 which matingly receives a load block 27. The beginning or outer end of the magnetic tape is coupled to the load block. The load block 27 can be removed from the recess 25 so as to unwind the magnetic tape from the cartridge. To facilitate the manipulation of the load block in and out of the recess, the load block is provided with a notch 29 at one, end. The notch 29 has two different widths, which will be explained in more detail hereinafter. The end of the tape (the inner end) is wrapped onto the cartridge spool. The first and second side walls 19, 21 in the cartridge have shallow notches 31 for receiving guide pins 33 (see FIG. 6) located on the apparatus of the present invention.

The cartridge 11 has a spool locking mechanism 35 for preventing rotational movement of the spool. The locking mechanism 35 includes a ferromagnetic plate 37 surrounded by teeth 39 and an runner button 41 movable relative to the plate. To unwind and wind the tape, the locking mechanism 35 must be disengaged by pushing the inner button 41 into the cartridge 11 relative to the plate 37 and retaining the button in that position.

Figure 2:
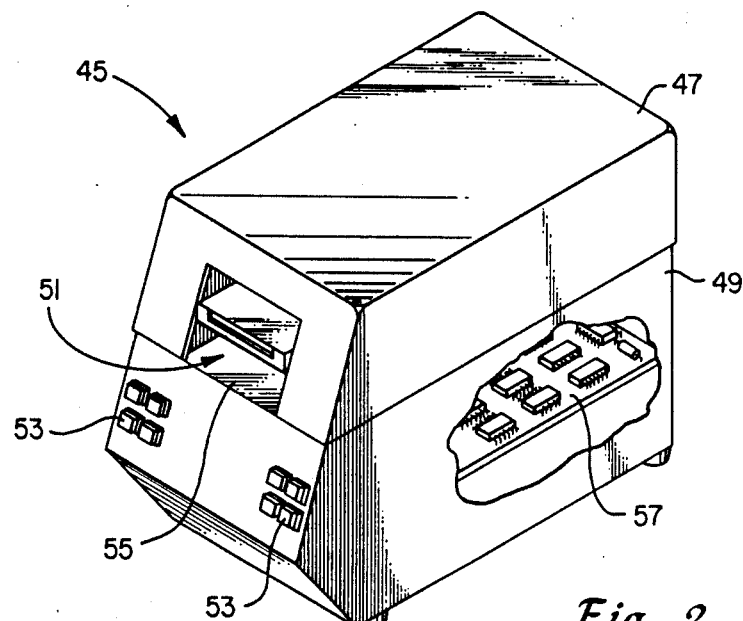
FIG. 2 is an isometric partially cut away view of the apparatus of the present invention, in accordance with a preferred embodiment.
Figure 3:
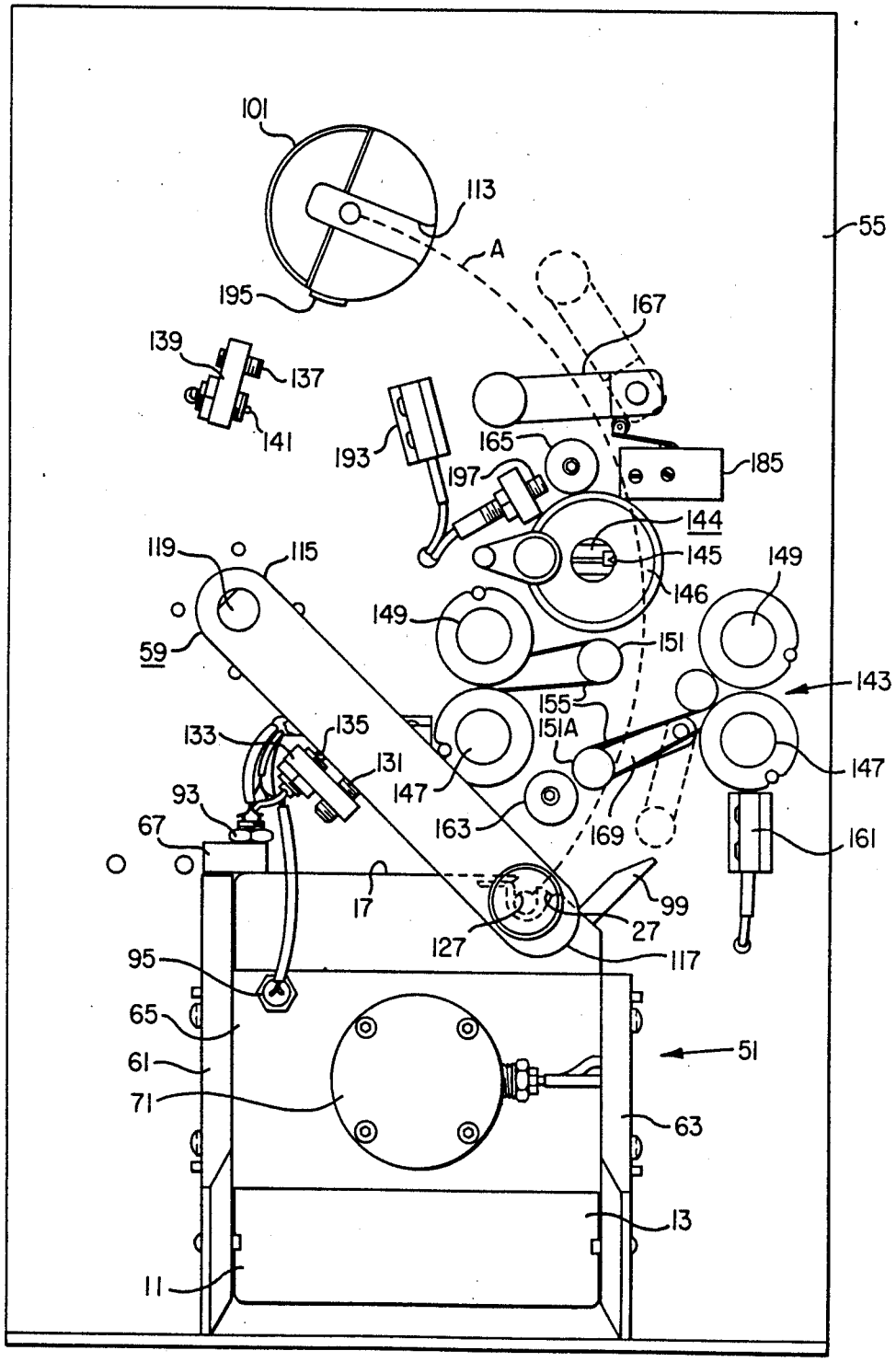
FIG. 3 is a plan view of the apparatus with the cover removed, showing the load arm in its first position, at the tape cartridge.
Figure 4:
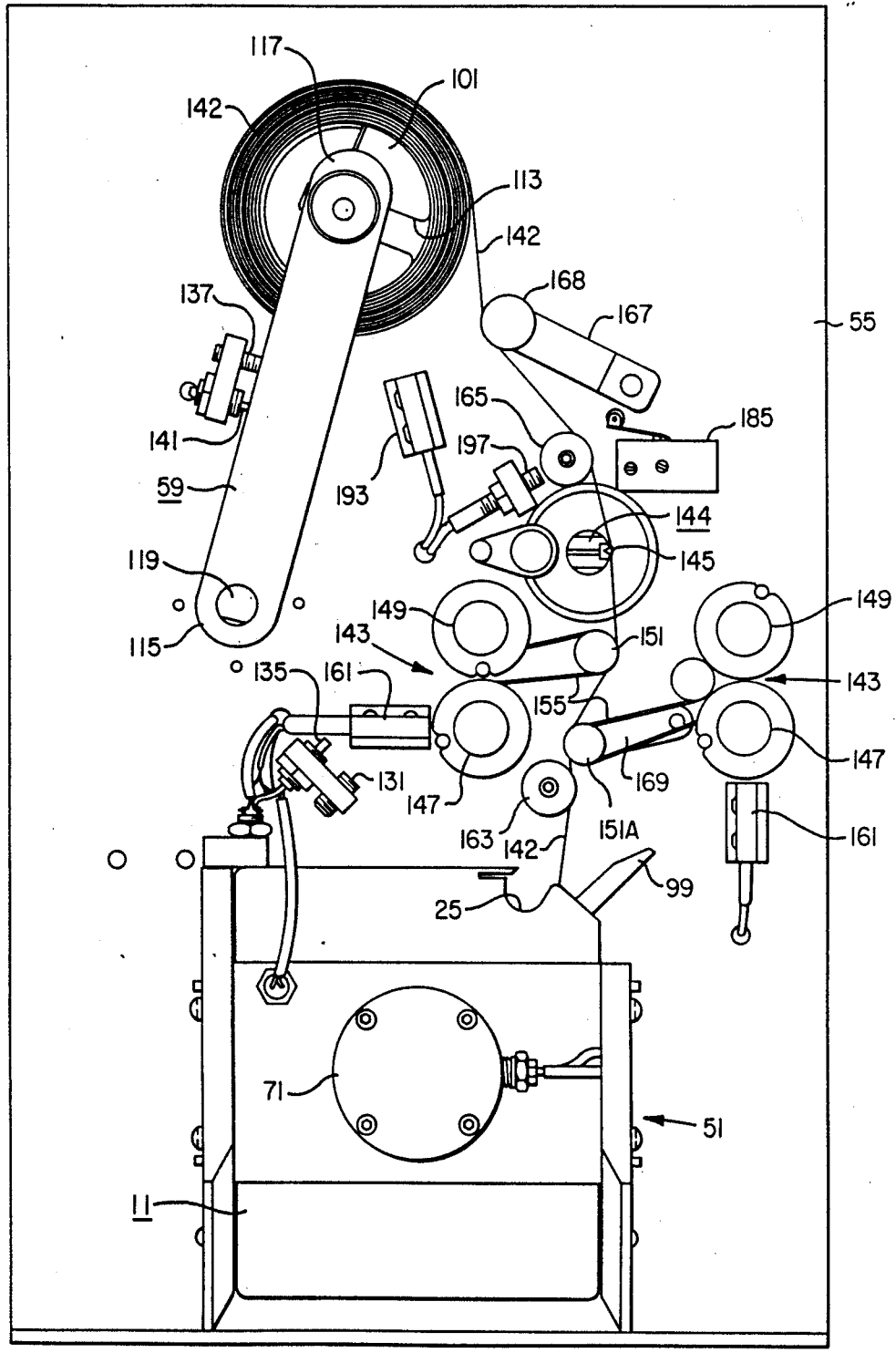
FIG. 4 is a plan view of the apparatus with the cover removed, showing the load arm in its second position, in the take-up hub.
Figure 5:
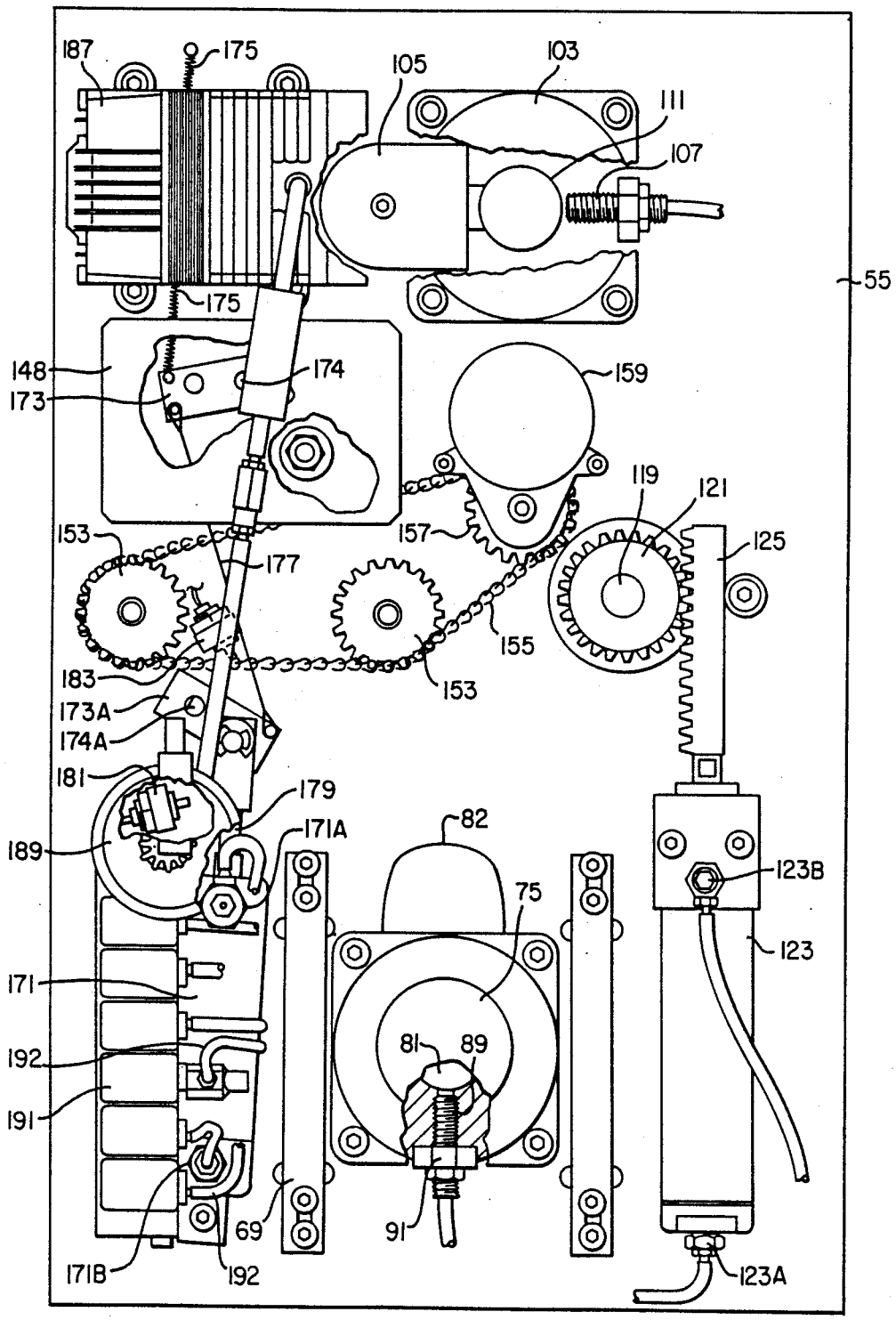
FIG. 5 is a view of the underside of the support plate showing the motors and the pneumatic system.
Figure 7A:
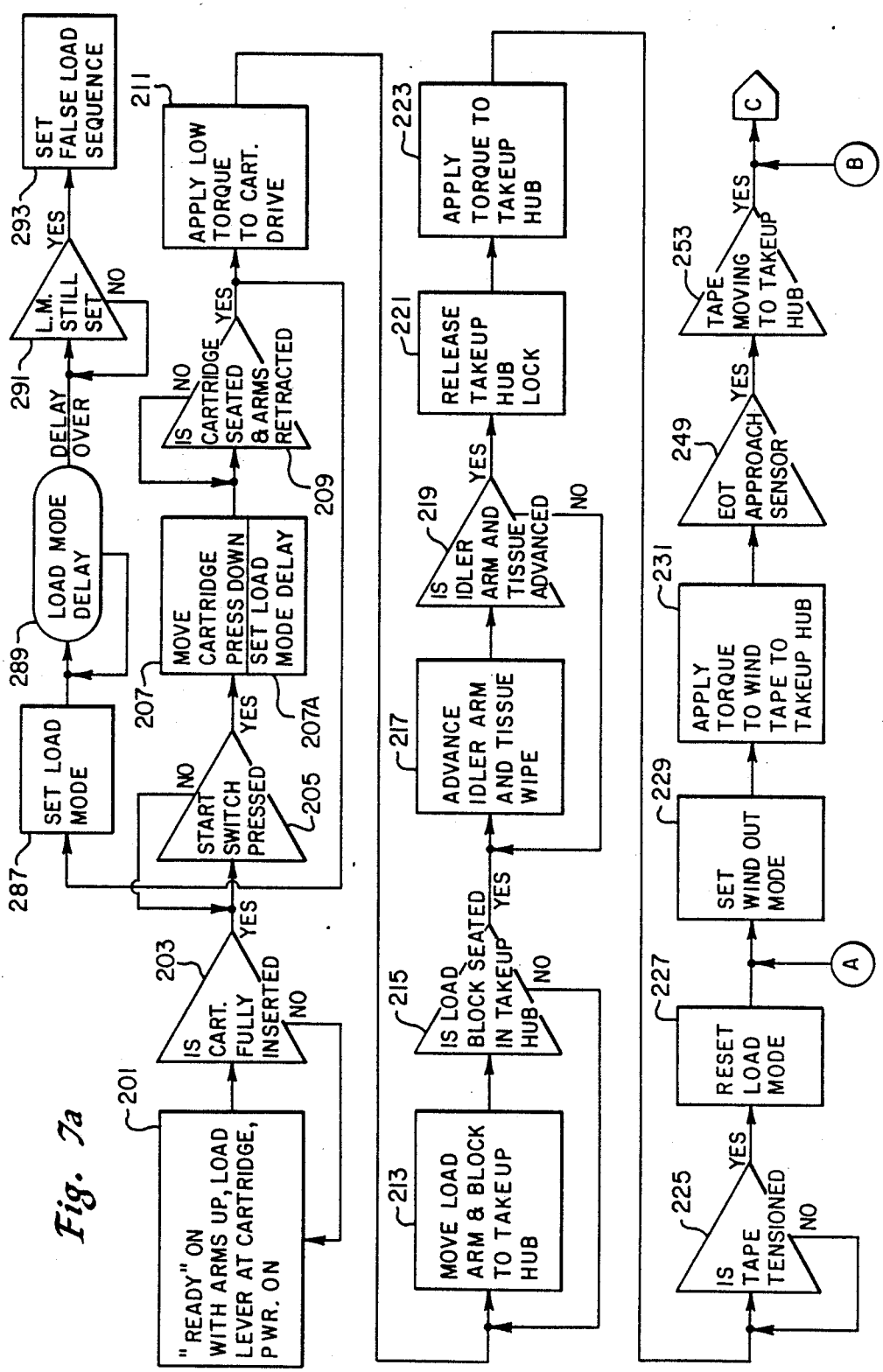
FIGS. 7a–7c are flow diagrams showing the operational steps in manipulating and cleaning the tape.
Figure 7B:
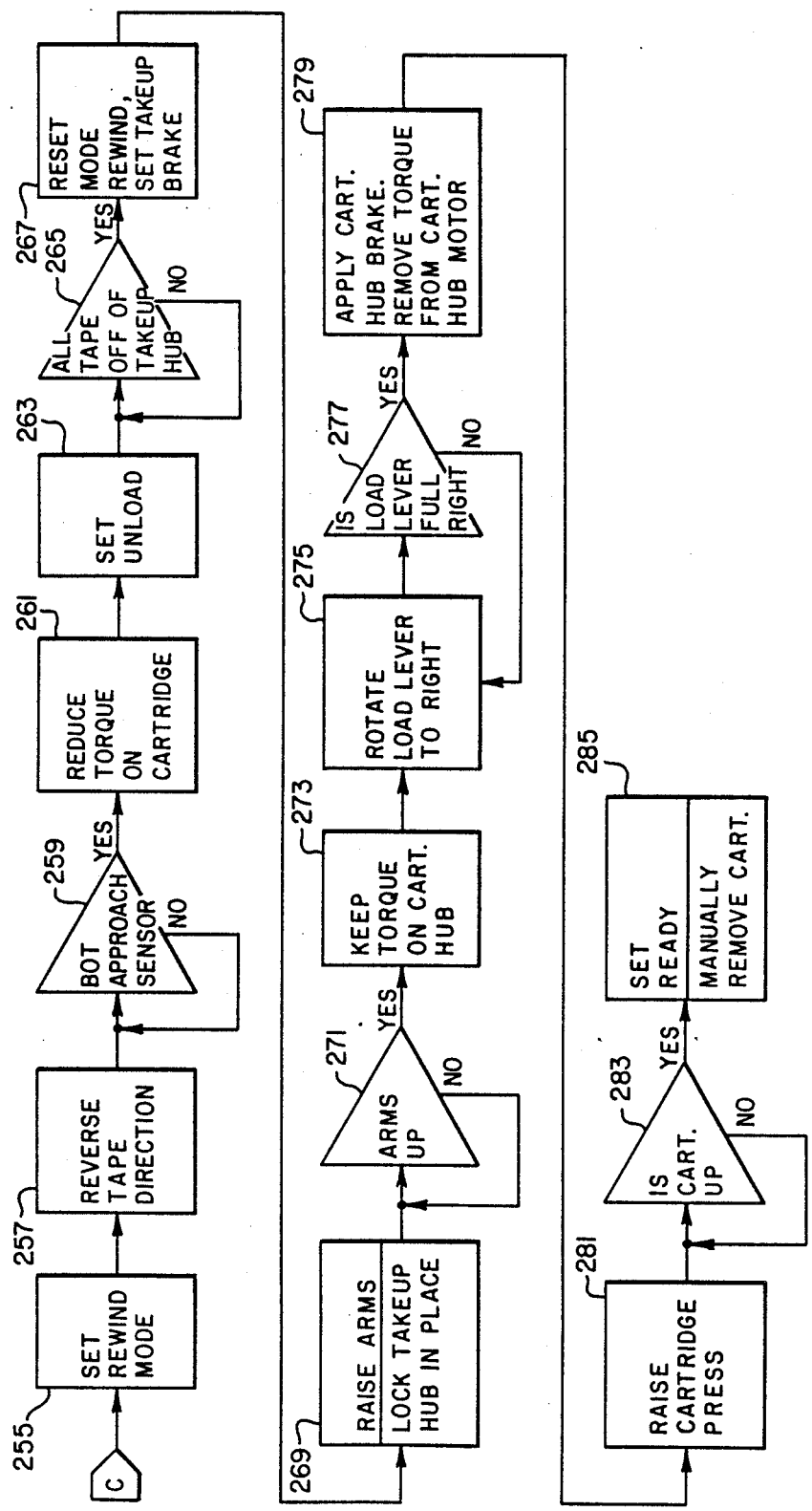
Figure 7C:
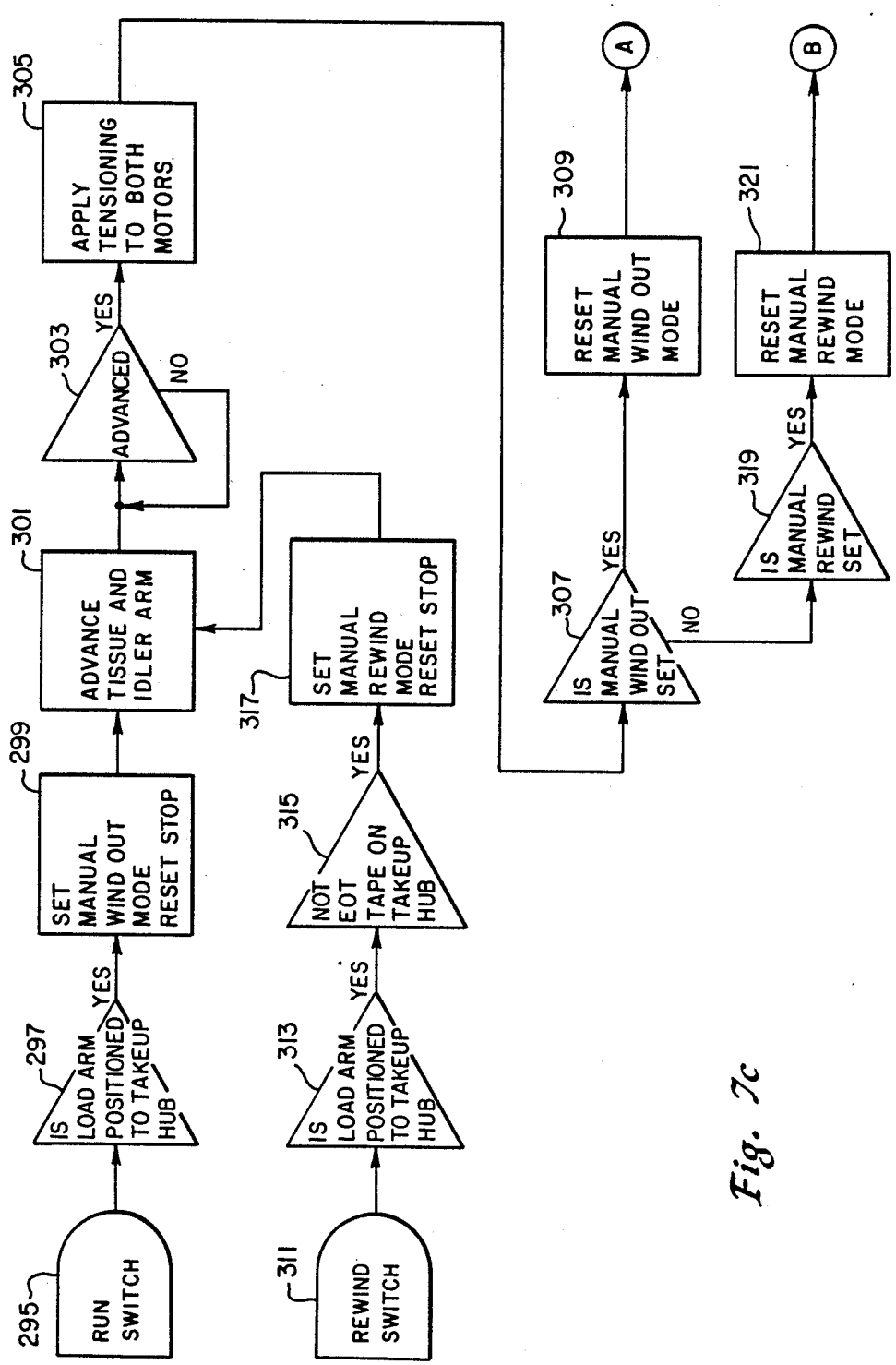

In FIG. 2, there is shown an isometric partially cut away view of the apparatus 45 of the present invention, in accordance with a preferred embodiment. The apparatus 45 has a housing, which includes a top cover 47 and a cabinet 49. The apparatus 45 has a recessed cartridge nest 51 for receiving the tape cartridge 11 which is to be cleaned. An operator's panel 53 with control buttons is also provided. The top cover 47 is removable to reveal a support plate 55 and components thereon. The support plate 55 has an upper side (shown in FIGS. 3 and 4) and a lower side (shown in FIG. 5). The orientation of FIG. 5 relative to FIGS. 3 and 4 is as follows: the left edge of the support plate 55 in FIG. 5 is shown as the support plate right edge in FIGS. 3 and 4, and the upper edge of the support plate in FIG. 5 is shows as the upper edge in FIGS. 3 and 4. The lower side of the support plate 55 is accessible from the interior of the cabinet 49. A circuit board 57 is located in the cabinet interior 58.

The apparatus 45 includes the cartridge nest 51, take-up means, a load arm 59, cleaning means, and control means. In describing the apparatus of the present invention it will be helpful to use the terms "right", "left", "front", and "back" with reference to the orientation of FIGS. 3 and 4 wherein the front of the apparatus is indicated by the lower portion of the drawings.

Figure 6:
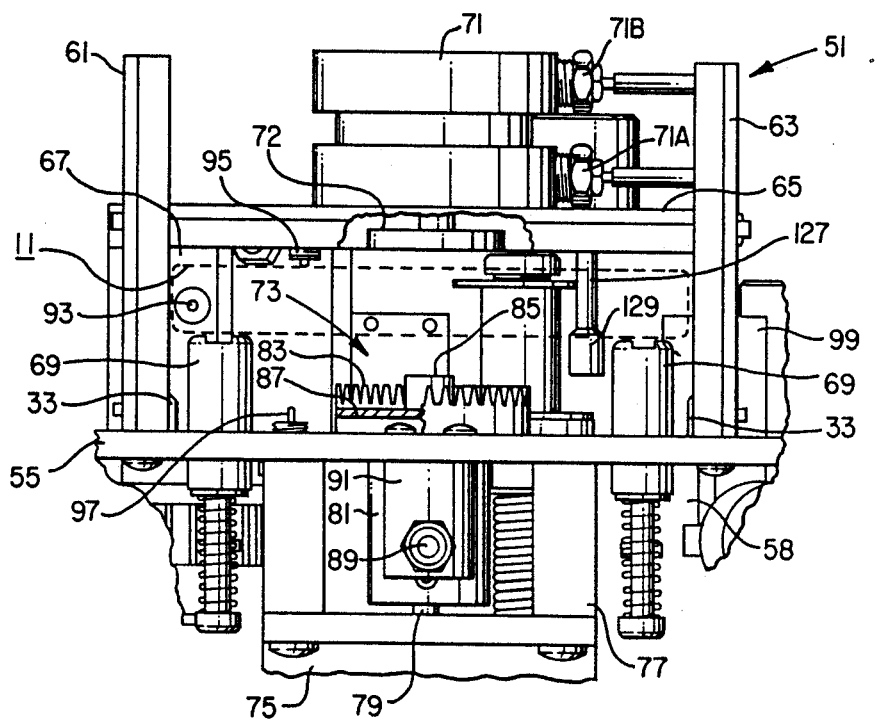
FIG. 6 is a front view of the cartridge nest, shown with the housing removed.

Referring to FIGS. 3 and 6, the cartridge nest 51 has two parallel side walls 61 63 coupled to the support plate 55 so as to be perpendicular to the support plate. The distance between the cartridge nest side walls 61, 63 is slightly larger than the distance between the cartridge first and second side walls 19, 21. A top wall 65 extends between the two side walls 61, 63 so as to form a rectangular space for receiving the cartridge 11 (shown in dashed lines in FIG. 6). A small wall 67 extends perpendicularly to the left side wall 61 so as to form a back stop for the cartridge 11. A pair of spring mounted guides 69 protrude through the support plate 55 into the cartridge nest. The guides 69 can be pushed down into the apparatus cabinet interior 58. The top wall 65 supports a pneumatic cartridge cylinder 71 with a pressure foot 72 that extends down towards the support plate 55 when the cartridge cylinder is actuated. The cartridge cylinder 71 and the spring mounted guides 69 respectively move the cartridge 11 between up and down positions inside of the cartridge nest 51.

In FIG. 6, the cartridge 11 is shown in the up position. In the up position, the cartridge 11 can be inserted and removed from the cartridge nest. The cartridge 11 is inserted into the cartridge nest such that its locking mechanism 35 faces the support plate 55. In the down position, the cartridge 11 engages a locking mechanism engage means 73 wherein the tape can be unwound for cleaning and then rewound back into the cartridge.

Below the cartridge cylinder 71 is the locking mechanism engage means 73 for engaging the cartridge locking mechanism 35. The locking mechanism engage means 73 is rotatable, being driven by a supply motor 75. The supply motor 75 depends from the support plate 55 by standoffs 77. The shaft 79 of the supply motor is coupled to a hub assembly 81 which in turn is coupled to the locking mechanism engage means 73. A brake 82 (See FIG. 5) releasably engages the hub assembly 81. The locking mechanism engage means 73 has teeth 83 to matingly engage the teeth 39 in the cartridge locking mechanism 35. A projection 85 protrudes upwardly so as to push in the cartridge button 41 when the locking mechanism engage means 73 engages the cartridge 11. An annular magnetic plate 87 is positioned between the teeth 83 and the projection 85. The magnetic plate 87 magnetically couples to the cartridge plate 37. A hub sensor 89 is mounted to the support plate 85, via a mounting bracket 91, so as to be adjacent to the hub assembly 81 (see also FIG. 5). The hub sensor 89 is a proximity switch that senses a magnet (not shown) embedded in the hub assembly. The cartridge nest 51 is provided with switches that sense the position of the cartridge 11 inside of the cartridge nest; an "in" switch 93, an "up" switch 95, and a "down" switch 97. The switches are of the normally open type. The cartridge nest has two guide pins 33 for matingly engaging the notches 31 in the side walls of the cartridge 11, when the cartridge is in the down position. A load block guide 99 is positioned adjacent to the cartridge nest. The load block guide 99 is a wall extending perpendicularly from the support plate 55. The guide 99 is positioned such that when the cartridge 11 is inserted into the cartridge nest 51, the load block 27 is adjacent to the load block guide.

Referring to FIGS. 3 and 5, the take-up means includes a take-up hub 101, a take-up motor 103, a brake 105, and a hub sensor 107. The take-up hub 101 is located on the upper side of the support plate 55, while the take-up motor 103 is located below the support plate. The take-up motor 103 depends from the support plate 55 by standoffs (not shown). The shaft of the take-up motor 103 is coupled to a hub assembly 111 which in turn is coupled to the take-up hub 101. Embedded in the hub assembly is a magnet (not shown) for use with the hub sensor 107 which is a proximity type switch. The brake 105 is positioned adjacent to the hub assembly 111. The take-up hub 101 has a channel 113 for receiving the load block 27. The diameter of the take-up hub 101 is equal to the diameter of the spool hub inside, of the cartridge 11.

Referring to FIGS. 3–5, and 8, the load arm 59 is an elongated member, having a fixed end 115 and a movable end 117. The fixed end 115 is pivotally coupled to the support plate 55 at some location between the cartridge nest 51 and the take-up hub 101. The load arm 59 is oriented parallel to the support plate 55. The fixed end 115 is coupled by way of a shaft 119 that extends perpendicularly through the support plate 55 to the cabinet interior where the shaft is coupled to a gear 121. A pneumatic load arm cylinder 123 is provided to actuate the gear 121 and thus the load arm 59. The shaft of the load arm cylinder 123 is fitted with a rack 125 that engages the gear 121. The movable end 117 of the load arm 59 has a rod 127 extending down towards the support plate 55. The lower end of the load arm rod 127 has an enlarged diameter forming a knob 129 for matingly engaging the load block notch 29 (shown in cross section in FIG. 8).

The load arm 59 is pivotable between a first position, wherein the load arm rod 127 is located adjacent to the cartridge nest 51 (see FIG. 3) and a second position, wherein the load arm rod 127 is located at the center of the take-up hub 101, inside of the take-up hub groove 113 (see FIG. 3). In moving between the first and second positions, the movable end 117 of the load arm follows an arcuate path A through the cleaning means 143, 144. Movement of the load arm 59 beyond the first position and into the cartridge nest 51 is prevented by a first position stop screw 131. The first position stop screw 131 is coupled to the support plate 55 by a mounting bracket 133. The distance the stop screw 131 projects may be adjusted to adjust the location of the load arm first position. The mounting bracket 133 is also provided with a limit switch 135 of the normally open type. When the load arm 59 is in the first position, the limit switch 135 is closed. Likewise, movement of the load arm beyond the second position is prevented by a second position stop screw 137. The second position stop screw 137 is mounted to the support plate by a mounting bracket 139. A limit switch 141 of the normally open type is on the mounting bracket 139 so as to be closed when the load arm 59 is in the second position.

The cleaning means is located adjacent to the load arm pivot path A. When cleaning the magnetic tape, the tape generally follows the circular pivot path A from the cartridge 11 to the take-up hub 101. When describing the cleaning means, it will b convenient to refer to the areas adjacent to the load arm pivot path A as being "inside" and "outside" of the arcuate path A. The area "inside" of the path includes the load arm 59, while the area "outside" of the path is the other side of the path A. The cleaning means includes a tissue assembly 143 located on each side of the pivot path A and a scraper assembly 144 located on the inside of the pivot path.

Each tissue assembly 143 includes a supply bobbin 147, a take-up bobbin 149, a respective tissue pin 151, 151A and a drive gear 153 located beneath the support plate 55 (see FIG. 5).

The tissue 155 in each tissue assembly is unwound from the respective supply bobbin 147, around the respective tissue pin 151, 151A so as to be exposed to the pivot path A, and then wound onto the take-up bobbin 149. Tissue tension is set during assembly of the apparatus by springs (not shown) located beneath the support plate 55 and located on the respective supply bobbin 147 shaft. Each take-up bobbin 149 is rotated by its respective drive gear 153 positioned below the support plate 55. The drive gears 153 are linked by a chain 155 to a sprocket 157 which is driven by a gear motor assembly 159. Thus, both tissue take-up bobbins 149 are operated simultaneously to take-up soiled tissue. The tissue pin 151A of the tissue assembly on the outside portion of the load arm pivot path A is movable to allow the load arm 59 to traverse the pivot path A and to provide proper tension on the tape. The movement of the tissue pin 151A will be described in more detail hereinafter. The respective supply bobbins 147 are provided with photoelectric sensors 161 for sensing the presence of tissue on the supply bobbins. When a supply bobbin 147 is empty of tissue 155, the respective sensor 161 signals the control means which lights a light on the operator's panel 53.

The scraper assembly 144 is located on the inside of the pivot path A so as to be exposed to the oxide side of the tape 142 (that is, the side of the tape that data is read from and written to). In the preferred embodiment, the scraper assembly includes an ultrasonic apparatus 144 as disclosed in Rubey, U.S. Pat. No. 4,620,256 and assigned to the assignee of this application. The ultrasonic apparatus 144 has a scraper blade 145, and an ultrasonic transducer 146 for vibrating the scraper blade. The ultrasonic apparatus 144 is provided with a circuit board 148 on the under side of the support plate 55, which circuit board has suitable ultrasonic driver circuitry for driving the ultrasonic transducer 146.

There is also provided tensioning means for maintaining the proper tension on the tape. As the tape is rewound into the cartridge, the tape is kept under about eight ounces of tension so as to comply with the cartridge specification. The tensioning means includes fixed first and second tape guides 163, 165, a retractable tension arm 167, and a retractable tissue arm 169. The tape guides 163, 165 are located in the inside area of the pivot path A. The first tape guide 163 is located between the cartridge nest 51 and the fixed tissue pin 151. The second tape guide 165 is located between the scraper assembly 144 and the take-up hub 101. The tape guides 163, 165 are rotatably mounted to the support plate 55. The tissue arm 169 is pivotable between a retracted positioned and a deployed position. In the retracted position (shown by dashed lines in FIG. 3), the tissue arm 169 is located away from the pivot path A to allow the tape and the load arm to traverse the pivot path. In the deployed position (see FIG. 4), the tissue arm 169 is pivoted towards and even across the pivot path so that the tissue pin 151A contacts the tape 142 at a point between the first tape guide 163 and the fixed tissue pin 151. The tension arm 167 is likewise pivotable between a retracted position and a deployed position. In the retracted position (shown by dashed lines in FIG. 3), the tissue arm 169 is located away from the pivot path A. In the deployed position (see FIG. 4), the tissue arm is pivoted towards and even across the pivot path to contact the tape 142 at a point between the second tape guide 165 and the take-up hub 101.

Both the tension arm 167 and the tissue arm 169 are moved between their respective retracted and deployed positions by a pneumatic tension arm cylinder 171 located beneath the support plate 55 (see FIG. 5). The cylinder 171 actuates the arms 167, 169 through respective lever assemblies located beneath the support plate. Each lever assembly includes a respective rectangular pivot plate 173, 173A which is pivotally coupled to the support plate 55. Each pivot plate 173, 173A is coupled to a respective arm 167, 169 and each is free to pivot about respective pins 174, 174A in a plane parallel to the support plate 55. The two pivot plates 173, 173A are coupled together as follows: a spring 175 couples the tension arm pivot plate 173 to the support plate 55, pulling the tension arm pivot plate 173 away from the tissue arm pivot plate 173A. The two pivot plates 173, 173A are linked by a cable 177. The shaft 179 of the tension arm cylinder 171 is coupled to the tissue arm pivot plate 173. As the shaft 179 extends outwardly from the cylinder 171, the two pivot plates 173, 173A pivot away from the cylinder, causing the respective arms 167, 169 to move to their deployed positions. As the shaft 179 retracts into the cylinder, the two pivot plates 173, 173A pivot towards the cylinder, causing the respective arms 167, 169 to move to their retracted positions.

Limit switches 181, 183 are provided beneath the support plate 55 and adjacent to the tissue arm pivot plate 173A. The limit switches detect when the arms 167, 169 are retracted and deployed. A retract limit switch 181 is provided so as to contact the pivot plate 173A when the tissue arm 169 is in the retracted position. The retract limit switch 181 is located between a pressure switch 189 and the support plate 55. A deploy limit switch 183 is provided so as to contact the pivot plate 173A when the tissue arm 169 is in the deployed position. The retract and deploy switches 181, 183 are normally open switches.

A limit switch 185 is provided on the upper side of the support plate 55, adjacent to the tension arm 167. If, during cleaning operations, the tape were to break, the spring 175 would pull the tension arm 167 towards the tissue assemblies 143 and actuate the limit switch 185, which would stop all operation. The limit switch 185 is relatively flat, projecting from the support plate only a short distance. Thus, the limit switch 185 does not interfere with the movement of the load arm 59, which passes over the limit switch.

A pneumatic system is provided to supply air for the cylinders. The pneumatic system includes a compressor 187, a pressure switch 189, a manifold 191, the cartridge cylinder 71, the load arm cylinder 123, and the tension arm cylinder 171. The compressor 187 provides a source of compressed air, and the pressure switch 187 regulates the air supply from the compressor. The manifold 191 distributes the air to the various cylinder fittings via air hoses 192. The cartridge cylinder 71 is provided with an up fitting 71A and a down fitting 71B (see FIG. 6) for connecting to respective air hoses. When air is supplied to the down fitting, the pressure foot 72 moves down. Likewise, when air is supplied to the up fitting, the pressure foot 72 moves up. The load arm cylinder 123 has a first position fitting 123A and a second position fitting 123B, wherein air supplied to the respective fittings moves the load arm to the respective positions. The tension arm cylinder 171 has a retracted arm fitting 171A and a deployed arm fitting 171B, wherein air supplied to the respective fittings moves the tension and tissue arms 167, 169 to the respective positions. The commercially available manifold 191 is provided with solenoids to control the flow of air to the cylinder fittings. The solenoids are controlled by the control means. Although the cleaning apparatus 45 is described with a pneumatic system to operate the load arm 59, the cartridge 11 and the tension arms 167, 169, alternative systems could be used. For example, electrical motors could operate the above components.

Figure 9:
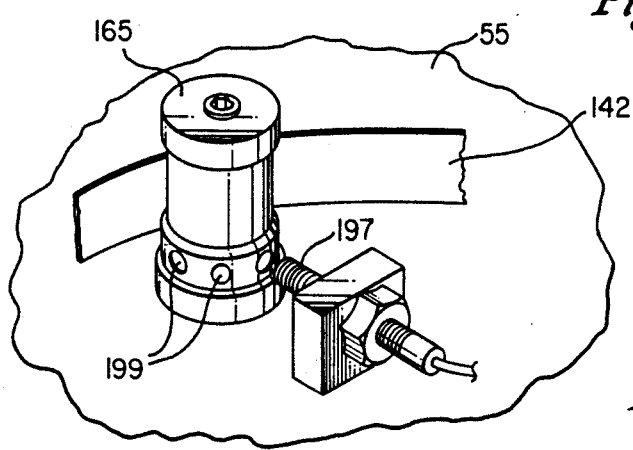
FIG. 9 is an isometric detail view of the second tape guide and its sensor.

The control means provides for automatic operation of the tape cleaning process. The control means includes control logic, switches, and manual interface controls 53. The control logic is located on the control circuit board 51 within the cabinet 49 (see FIG. 2). The control logic can be implemented either by digital discrete logic elements or with a microprocessor. The manual interface controls 53 are provided on the front of the apparatus for easy access by the operator. The switches include the cartridge position switches 93, 95, 97 (in, up, down); the load arm limit switches 135, 141 (first position, second positions); the tissue supply sensors 161; the tissue arm position switches 181, 183; and the tension arm limit switch 185. There are also sensors 89, 107 for use in detecting the beginning and end of the tape 142. A photoelectric sensor 193 is provided near the take-up hub 101. The take-up hub has a piece of reflective tape 195 mounted thereon, clockwise from the channel 113. In FIG. 3, the thickness of the tape 195 is exaggerated for clarity. As the magnetic tape is unwound from the take-up hub 101 back into the cartridge 11, on the last revolution of the take-up hub 101, the reflective tape 195 is uncovered by the magnetic tape 142. There is another photoelectric sensor 197 positioned adjacent to the second tape guide 165. The second tape guide 165 has small holes 199 drilled into its perimeter (see FIG. 9) which holes 199 are detectable by the sensor 197. The holes 199 are spaced apart a uniform and known distance. In the preferred embodiment, the holes 199 are spaced apart one-fourth of an inch. The second tape guide 165 and the sensor 197 are used to control the speed of the tape during the wind out and rewind modes, and to determine the end-of-tape and the beginning-of-tape, wherein the motors 75, 103 can be stopped.

The operation of the apparatus of the present invention will now be described. The apparatus 45 automatically cleans the magnetic tape in the cartridge by unwinding the tape 142 out from the cartridge 11 to the take-up hub 101 and then rewinding the tape from the take-up hub back into the cartridge. During the unwinding and rewinding operations, the tape is cleaned by the tissues 155 and the scraper assembly 144.

Automatic operation of the apparatus is provided by the control means. The control means operates in the following modes to carry out operations: load mode; wind out mode; rewind mode; unload mode; load delay mode; manual wind out mode; and manual rewind mode. In the load mode, the control means senses the presence of the cartridge 11 in the control nest 51 and forces the cartridge to the down position, wherein the locking mechanism engage means 73 unlocks the cartridge locking mechanism 35. The load arm 59 becomes coupled to the cartridge load block 27 during the downward movement of the cartridge. The load arm 59 then swings from the cartridge nest 51 to the take-up hub 101, stringing the tape through the tissue assemblies 143 and past the scraper assembly 144. In the wind out mode, the take-up hub 101 is rotated to wind the tape on itself. As the take-up hub rotates, it pulls the tape out of the cartridge and through the tissue assemblies 143 and the scraper assembly 144. The control means senses when the cartridge is almost out of tape, wherein it changes from the wind out mode to the rewind mode. In the rewind mode, the cartridge hub is rotated to wind the tape back into the cartridge. As the cartridge hub rotates, it pulls the tape off the take-up hub and through the tissue assemblies 143 and the scraper assembly 144. The tape is thus cleaned while it is winding out to the take-up hub and then rewinding back into the cartridge. The control means senses when the take-up hub is almost out of tape, wherein it slows the tape speed down and finally stops the rewind process. In the unload mode, the load arm 59 swings from the take-up hub back to the cartridge nest 51 and replaces the load block 27 back into the cartridge. The cartridge 11 is then raised to the up position. The cartridge can then be removed from the apparatus. The load delay mode is set during the load mode. If, for some reason, the load block 27 is not located in the take-up hub during the load mode, then after a set period of time, the load mode would cause an error condition to be indicated and the control means would automatically enter the unload mode to return the load block 27 to the cartridge and the cartridge to the up position. The manual wind out and rewind modes are used if, during the cleaning operation, the tape were to stop. The manual wind out and rewind modes allow a manual restart, wherein the apparatus is restarted and enters either the wind out mode or the rewind mode.

Referring to FIGS. 2–5, 7a–7c, the operation of the apparatus 45 will be described in further detail. The operator turns on the power by way of a button on the operator's panel 53, and the apparatus initializes 201 itself to a ready condition. In the ready condition, the load arm 59 is in the first position, as shown in FIG. 3, and the tension arm 167 and the tissue arm 169 are pulled back to their respective retracted positions from their deployed positions (as shown by the dashed lines in FIG. 3). The arms 167, 169 are pulled back by actuating the tension arm cylinder 163 with air from the manifold. The control means operates the appropriate solenoid in the manifold 191.

Next, the operator inserts the cartridge 11 which is to be cleaned into the cartridge nest 51. The cartridge 11 is inserted with its locking mechanism 35 down, so as to face the locking mechanism engage means 73 of the apparatus 45. The front side wall 17 of the cartridge is inserted into the cartridge nest 51 first, so that the load block notch 29 engages the load arm rod 127 (see FIG. 8). The load block notch 29 engages a portion of the rod 127 with the smallest diameter, wherein the nob 129 is physically located between the load block 27 and the support plate 55. The next step is to determine 203 if the cartridge 11 is fully or properly inserted into the cartridge nest 51. Proper insertion of the cartridge closes the "in" limit switch 93.

Figure 8:
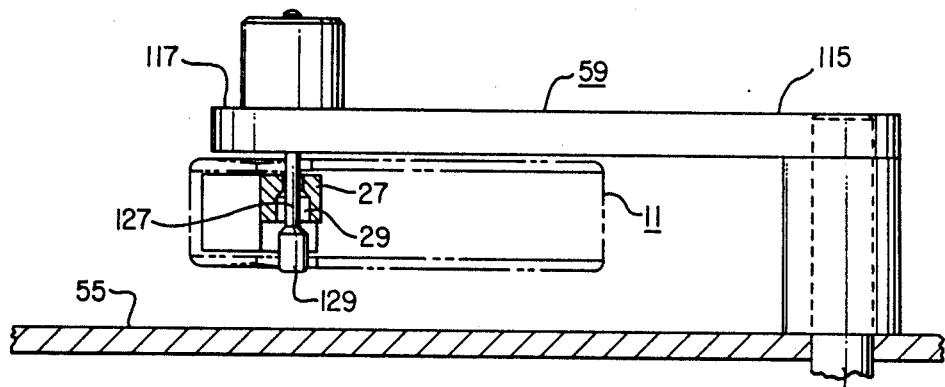
FIG. 8 is a schematic side view of the load arm, showing the support plate and the cartridge load block in cross section.

After inserting the cartridge 11 into the cartridge nest 51, the operator presses 205 a "start" button, wherein the control means enters the load mode. The cartridge 11 is moved 207 down so that the cartridge locking mechanism 35 engages the locking mechanism engage means 73 of the apparatus. The cartridge cylinder 71 is actuated to extend its pressure foot 72 in a downwardly direction. The pressure foot 72 contacts the top wall 13 of the cartridge 11 and pushes the cartridge down. The cartridge forces the guides 69 into the cabinet interior 58 (see FIG. 6). When the cartridge 11 is forced down sufficiently far enough, the apparatus teeth 83 engage the cartridge teeth 39, the apparatus magnetic plate 87 magnetically couples to the cartridge plate 37, and the apparatus projection 85 pushes the cartridge button 41 into the cartridge, thereby unlocking the cartridge locking mechanism 35 and allowing the tape to be unwound from the cartridge. Referring to FIG. 8, where the load block 27 is shown in the up position, when the cartridge 11 is pushed down, the load block 27 is pushed down on the knob 129 of the load arm rod 127, so that the rod and knob matingly engage the load block notch 29. Any lateral movement of the load arm rod 129 will cause the load block 27 to move in unison therewith. Also, when the cartridge is pushed down, the guide pins 33 (shown in FIG. 6) engage the notches 31 in the cartridge. When the cartridge 11 engages the locking mechanism engage means 73, the "down" switch 97 is closed. The control means detects 209 the down position of the cartridge and also checks to verify that the tension arm 167 and the tissue arm 169 are retracted, by way of the retract limit switch 181.

Then, the control means applies 211 a small amount of back torque to the supply motor 75 to keep some tension on the tape. The control means actuates 213 the load arm cylinder 123 to swing the load arm 59 from the first position to the second position. As the load arm swings to the second position, the rod 127 moves the load block 27 along with the load arm, thereby unwinding a portion of tape from the cartridge. The rod 127 and load block 27 follow the pivot path A, wherein the tape is strung between the tissue assemblies 143 and past the scraper means 144. The load block 27 is matingly received by the channel 113 in the take-up hub 101. The load arm 59 stops in the second position when it contacts the second position stop screw 137. With the load arm in the second position, the rod 127 is concentric to the axis of rotation of the tape up hub 101. The control means then determines 215 if the load arm is in the second position and if the load block is seated in the take-up hub. If the second position limit switch 141 is closed, then the load arm is properly positioned.

Next, the tension arm 167 and the tissue arm 169 are advanced 217 from their respective retracted positions to their respective deployed positions. The control means activates the tension arm cylinder 171 to move the pivot plates 173, 173A and thus the arms 167, 169. The control means then determines 219 if the tension (or idler) arm 167 and the tissue arm 169 have been deployed by sensing if the deployed limit switch 183 is closed. When the tension arm 167 is deployed, its roller 168 contacts the tape 142. When the tissue arm 169 is deployed, its tissue pin 151A presses on the tape 142.

The control means releases 221 the brakes 82, 105 and then applies 223 low torque to both the take-up motor 103 and the supply motor 75 to take the slack out of the tape. The take-up motor 103 and the supply motor 75 produce torque in opposite directions on the tape, effectively pulling on both ends of the tape 142 and thereby tensioning the tape. The control means checks 225, using the limit switch 185, to determine if the tape is tensioned. If the tape is tensioned, the tension arm 167 opens the limit switch 185. The load mode is then reset 227; the load mode will be explained in more detail hereinafter.

The control means then enters 229 the wind out mode, wherein the tape 142 is wound onto the take-up hub 101. Torque is applied 231 to the take-up motor 103, thus rotating the take-up hub 101 and pulling the tape out of the cartridge 11 and through the tissues 155 and the scraper assembly 144. The tissues 155 continuously advance to the respective take-up bobbins 149 when the tape is wound out and rewound. In the preferred embodiment, the motor 159 operates the take-up bobbins 149 at about two revolutions per hour. As the tape is wound onto the take-up hub 101, it contacts the tissue pins 151, 151A and is cleaned on both sides by the tissues. The tape also contacts the scraper assembly 144, which scrapes debris off of the oxide side of the tape. As the take-up hub 101 rotates, the rod 127 of the load arm 59 is positioned in the rotational center of the take-up hub and remains stationary. The load block 27 rotates around the load arm rod 127, being constrained to rotate with the take-up hub 101 by the groove 113. If, for some reason, the tape 142 were to loose tension during either the wind out mode or the rewind mode, then the tension arm 167 would close the limit switch 185 and all power would be removed from the motors 75, 103, bringing everything to a halt. An error light would be illuminated on the operator's panel 53.

During the wind out and rewind modes the tension of the tape is monitored and controlled. The ANSI specification for the 3480 cartridge requires that the tape be wound into the cartridge under a tension of eight ounces plus or minus fifteen percent. The supply motor 75 and the take-up motor 103 are ac motors and have a linear torque-speed relationship. Thus, the tape tension can be controlled by controlling the speed of the motors.

The take-up motor 103 and the supply motor 75 can be operated at different speeds to provide for different levels of torque. Referring to FIG. 10, each motor 75, 103 is connected to plural inputs through respective resistors 233, 235. Large torque inputs, such as WIND OUT TORQUE and REWIND TORQUE are connected to the motors through the smallest resistance. Small DRAG TORQUE signals are always applied to the motors whenever the tape is strung between the take-up hub 101 and the cartridge 11, to maintain tape tension.

In the preferred embodiment, the take-up motor 103 produces torque in the counterclockwise direction, while the supply motor 75 produces torque in the clockwise direction (when viewed from the upper side of the support plate 55 as in FIGS. 3 and 4).

Tape tension is controlled by providing drag on the tape from whichever hub it is being unwound from. For example, during the wind out mode, the take-up hub 101 is rotated in a counterclockwise direction. A small amount of electrical power (TENSION TORQUE in FIG. 10) is supplied to the supply motor 75 to provide a small amount of clockwise torque to create some drag on the tape. This tensioning torque is cut on and off from the supply motor as needed. Referring to FIGS. 10 and 11, a WIND OUT TORQUE signal is applied 231 to the take-up motor 103, which rotates the take-up hub 101 in the counterclockwise direction. The speed of the tape is checked 237 from the second tape guide 165 and the sensor 197 (see FIG. 9). The tape 142 rotates the second tape guide 165, which rotations are detected by the sensor 197 sensing the holes 199. A pulse train 239 is thus produced by the sensor (see FIG. 12), with each pulse representing a hole 199 going past the sensor 197. The distance between each pulse represents one-quarter inch of tape. Thus, the time between pulses is used to determine tape speed. If the tape speed is determined 241 to be too fast, a TENSION TORQUE is applied 243 to the supply motor 75. The TENSION TORQUE is applied through a higher resistance than is the WIND OUT TORQUE as supplied to the take-up motor 103. The TENSION TORQUE causes the supply motor 75 to exert a small amount of torque in the clockwise direction, putting drag on the tape 142 and slowing it down. If the tape speed is not too fast, then it is determined 245 if tension torque is being applied to the supply motor 75. If it is, the torque is removed 247. The tape speed is then rechecked 237. The tension arm 167 dampens any sudden changes in tape tension brought about by sudden tape speed changes.

In the wind out mode, the take-up hub 101 is rotated until the control means senses 249 (see FIG. 7a) the approach of the end of tape. In 3480 tape cartridges, the length of the tape can vary from four hundred fifty feet to six hundred feet and the tape has no markers indicating its beginning or end. The end of the tape inside of the cartridge is not coupled to the cartridge spool; instead the tape is simply wound onto the cartridge spool. To prevent the winding of the end of the tape out of the cartridge, the apparatus senses the approach of the end of tape so that the tape wind out can be stopped with some of the end portion of the tape still wound onto the cartridge spool.

To determine the end of tape, the second tape guide 165 and its sensor 197 are used, along with the cartridge hub sensor 89. The diameter of the cartridge spool is known; when the spool is empty a certain amount of tape will be wound off of the spool for each revolution. The diameter of the cartridge spool or hub is about two inches, so that when the spool is almost empty, about six inches of tape per spool revolution will be wound off of the spool. The amount of tape wound off per spool revolution changes during the wind out process. When the spool is full, much more than six inches of tape will be wound off. The amount of tape wound off per spool revolution is determined by comparison to the reference established by the second tape guide 165 and sensor 197. Referring to FIG. 12, the pulse train 239 produced by the sensor 197 is compared to the time between successive pulses 251 of the hub sensor 89, which indicate one revolution of the cartridge hub. When the time between successive hub sensor pulses 251 equals the designated number of pulses 239, an end of tape signal is generated 249. When the end of tape is calculated, the control means checks 253 to make sure the tape is being wound out to the take-up hub, wherein any false end of tapes are ignored.

Next, the control means enters 255 the rewind mode. REWIND TORQUE is applied to the supply motor 75, which reverses 257 the tape direction. The tape is then rewound from the tape hub 101 back to the cartridge 11 spool. A counterclockwise TENSION TORQUE is applied to the take-up motor 103 as needed to maintain the required tape tension. Tape tension in the rewind mode is maintained in a similar manner as in the wind out mode. As the tape is rewound it is cleaned again by the tissues 155 and the scraper assembly 144. The approach of the beginning of tape, which is on the take-up hub 101, is determined 259 in a similar manner to the determination of the end of tape. The diameter of the take-up hub 101 is equal to the diameter of the cartridge spool. The hub sensor 107 is used to determine revolutions of the take-up hub 101. When the approach of the beginning of tape is calculated, the supply motor 75 is slowed 261 by removing the REWIND TORQUE and applying a lower UNLOAD TORQUE. The friction of the tape through the tissues slows the tape speed.

The control means enters 263 the unload mode, wherein as the last of the tape is slowly unwound from the take-up hub, the reflective marker 195 is uncovered and is detected 265 by the sensor 193. Because the tape is under tension from the supply motor 75, and because the take-up motor 103 is no longer under power, the take-up hub 101 will stop when all of the tape is unwound, thus leaving the groove 113 in its original pre-load alignment (as shown in FIG. 3). The take-up brake 105 is then set 267.

The tension and tissue arms 167, 169 are then retracted 269, activating 271 the limit switch 181. The UNLOAD TORQUE is kept 273 on the supply motor 75 to rewind the tape as the load arm swings 275 back to the first position. The load arm 59 is then moved from its second position in the take-up hub to its first position by the cartridge nest 51. The load block guide 99 guides the load block 27 back into the recess 25 of the cartridge 11. When the load arm 59 is back in the first position, the first position limit switch 135 is actuated 277, indicating the load arm position to the control means. The supply motor brake 82 is set 279 and all power to the supply motor 75 is removed. The cartridge nest cylinder 71 is operated 281 to raise the pressure foot 72. The spring mounted guides 69 push the cartridge 11 to the up position, closing 283 the "up" limit switch 95. The ready light is then illuminated 285 and the operator can remove the cleaned cartridge from the apparatus.

In the event of a problem occurring during the stringing of the tape 142 from the cartridge 11 to the take-up hub 101, the apparatus will so signify. In the load mode, when the cartridge 11 is moved 207 to the down position, a load mode time delay is set 207A. When the cartridge is seated 209 and the arms 167, 169 are retracted, a load mode gate is set 287, wherein the time delay is monitored 289. The load mode gate is reset 227, or switched off, after the tension arm 167 opens the limit switch 185. If, after the time delay lapses, and the load mode is still set 291, then a false load sequence is set 293 wherein an error light is illuminated at the operator's panel 53 and the unload sequence is entered.

In the event of a problem occurring (such as tape breakage) during the cleaning of the tape, the apparatus stops tape movement by stopping the motors. The operator can correct the problem and restart operation. To restart the apparatus winding out tape to the take-up hub, the operator presses 295 a "run" switch. The control means checks 297 to see if the load arm 59 is positioned in the take-up hub 101 via the limit switch 141. The manual wind out mode is set 299 and the tension and tissue arms are advanced 301 to their deployed positions, having been retracted due to the stop in operation. After checking 303 to see if the tension and tissue arms have been advanced, power is applied 305 to both motors 75, 103 to tension the tape. This is done by applying drag torque signals to both motors (see FIG. 10). Then, it is determined 307 if the manual wind out mode or the manual rewind mode is set (the manual rewind mode being set due to the operator pressing a "rewind" switch instead of the "run" switch). The manual wind out mode is then reset 309 and the apparatus enters automatic operation once again by setting the wind out mode. If the operator pressed 311 the "rewind" switch instead, the position of the load arm is checked 313 to verify that it is in the second position and also determines 315 if the end of tape has not yet been sensed. Then, the manual rewind mode is set 317 and the tension and tissue arms are advanced 301. After determining 319 that the manual rewind mode is set, the manual rewind mode 321 is then reset and the apparatus enters automatic operation once again by setting the rewind mode.

The foregoing disclosure and the showings made in the drawings are merely illustrative of the principles of the invention and are not to be interpreted in a limiting sense.

I claim:

1. An apparatus for automatically cleaning magnetic tape contained in a cartridge, said tape having a beginning and an end and being wound around spool means inside of said cartridge such that said tape beginning is unwound before said tape and, said cartridge having releasable locking means for preventing the movement of tape in and out of said cartridge, wall means for enclosing said spool means, and tape load means located at the beginning of the tape, comprising:
   (a) cartridge receiving means adapted for receiving and retaining said cartridge, said cartridge receiving means having locking means engaging means, for engaging and releasing said cartridge locking means;
   (b) said cartridge receiving means having first motor means adapted for rotating said cartridge spool means;
   (c) take-up means for unwinding ;said tape from said cartridge, said take-up means having a take-up hub and second motor means for rotating said take-up hub, said take-up means receiving said tape load means;
   (d) tape transfer means for transferring said tape load means between said cartridge and said take-up hub, said tape transfer means having arm means, said arm means having coupling means for releasably coupling to said tape load means, said arm means being pivotable between first and second positions, said first position of said arm means having said coupling means positioned so as to engage said tape load means, said second position of said arm means having said coupling means located at said take-up means, said arm means coupling means following a path between said first and second positions;
   (e) cleaning means for cleaning said tape, said cleaning means being located adjacent to said path and comprising wiper means for wiping both sides of said tape and scraper means for scraping the side of said tape that is adapted to contain data;
   (f) control means for automatically controlling the manipulation and cleaning of said tape, said control means causing said locking means engaging means to engage and release said cartridge locking means, said tape transfer means to transfer said tape load means from said cartridge to said take-up hub so as to string the tape through said cleaning means, said second motor means to rotate said take-up hub so as to wind the tape onto said take-up hub, said cleaning means to clean the tape as the tape is wound into said take-up hub, said first motor means to rotate said cartridge spool means so as to rewind the tape back into the cartridge and onto said cartridge spool means, said tape transfer means to transfer said tape load means from said take-up hub to said cartridge, and said locking means engaging means to disengage said cartridge lock means.

2. The apparatus of claim 1 wherein:
   (a) said wiper means comprises first and second tissue assemblies, with a tissue assembly being positioned on each side of said tape when said tape is strung to said take-up means;
   (b) one of said tissue assemblies has a pivotable arm which pivots between a retracted position and a deployed position, said retracted position allowing said tape transfer means to move between said first and second positions, said deployed position bringing cleaning tissue into contact with said tape.

3. The apparatus of claim 2 wherein said control means controls the tension of said tape when said tape is rewound to said cartridge by applying reverse torque to said second motor means so as to create drag on said tape at said take-up means.

4. The apparatus of claim 3 wherein said control means comprises tape speed sense means for determining the speed of said tape when said tape is rewound to said cartridge, said control means applying reverse torque to said second motor means in such a manner so as to maintain a predetermined tape speed.

5. The apparatus of claim 4 wherein:
   (a) said control means comprises cartridge revolution sense means for sensing the revolutions of said cartridge spool;
   (b) said tape speed sense means being calibrated to determine tape length so that the control means can determine the tape length being unwound from said cartridge spool;
   (c) said control means detects the approach of the end of tape when unwinding said tape from said cartridge so that said second motor means can be stopped.

6. An apparatus for automatically cleaning magnetic tape contained in a cartridge, said tape having a beginning and an end and being wound around spool means inside of said cartridge such that said tape beginning is unwound before said tape end, said cartridge having releasable locking means for preventing the movement of tape in and out of said cartridge, wall means for enclosing said spool means and a load block coupled to the beginning of the tape, comprising:
   (a) cartridge receiving means adapted for receiving and retaining said cartridge, said cartridge receiving means having locking means engaging means for engaging and releasing said cartridge locking means;

(b) first motor means adapted for rotating said cartridge spool means when said locking means engaging means has released said cartridge locking means, said first motor means being located near said cartridge receiving means;

(c) take-up means for unwinding said tape from said cartridge, said take-up means having a take-up hub and second motor means for rotating said take-up hub, said take-up means receiving said tape load means;

(d) a load arm having two ends, with one of said ends being pivotable about the other end, said one end having a rod projecting out from said load arm, said rod having an enlarged portion, said rod and said enlarged portion adapted to matingly engage a notch in said load block;

(e) said load arm being pivotable between first and second positions, with said first position having said rod located at said cartridge receiving means such that said rod can be received by said cartridge load block notch, and with said second position having said rod located at said take-up hub;

(f) cleaning means for cleaning said tape, said cleaning means being located between said cartridge receiving means and said take-up hub, said cleaning means comprising wiper means for wiping the tape and scraper means for scraping debris off of the tape;

(g) control means for automatically controlling the manipulation and cleaning of said tape, said control means comprising load arm position sense means for sensing the position of said load arm, tensioning means for controlling the tension of the tape as the tape is wound back into the cartridge, and end-of-tape sense means for sensing the end of the tape as the tape is wound on the take-up hub;

(h) said control means causing said locking means engaging means to engage and release said cartridge locking means, causing said load arm to transfer said load block from said cartridge to said take-up hub so as to string the tape through said cleaning means, sensing when said load arm is in the second position with said load arm position sense means, causing said second motor means to rotate said take-up hub so as to wind the tape onto said take-up hub, causing said cleaning means to clean the tape as the tape is wound onto said take-up hub, sensing the end of the tape as the tape is wound onto said take-up hub with said end-of-tape sense means, causing said first motor means to rotate said cartridge spool means so as to rewind the tape back into the cartridge and onto said cartridge spool means when the end of the tape is sensed, sensing and controlling the tension of the tape as the tape is wound back into the cartridge with said tensioning means, causing said load arm to transfer said load block from said take-up hub to said cartridge, sensing when said load arm is in the first position with said load arm sense means, and causing said locking means engaging means to disengage said cartridge lock means.

7. The apparatus of claim 6 wherein said tensioning means controls the tension of the tape when the tape is rewound to said cartridge by applying reverse torque to said second motor means so as to create drag on the tape at said take-up means.

8. The apparatus of claim 7 wherein:

(a) said first and second motor means comprise respective motors having linear torque-speed relationships such that by controlling the speed of said respective motor, the torque of that motor can be controlled;

(b) said tensioning means comprises tape speed sense means for sensing the speed of the tape when the tape is rewound into the cartridge;

(c) said tensioning means applying reverse torque to said second motor means when the tape is being rewound into the cartridge so as to create drag, said reverse torque being applied to said second motor means in such a manner so as to maintain a predetermined tape speed.

9. The apparatus of claim 8 wherein said tensioning means further comprises a spring loaded tension arm that contacts the tape, said tension arm dampening sudden changes in tape speed.

10. The apparatus of claim 8 wherein:

(a) said end-of-tape sense means comprises cartridge spool means sense means for sensing the revolutions of said cartridge spool means;

(b) said end-of-tape sense means comprises tape quantity sense means for sensing the quantity of tape per unit time as the tape is wound to the take-up hub;

(c) said end-of-tape sense means compares the quantity of tape unwound from said cartridge spool means, as determined by said tape quantity sense means, for a revolution of said cartridge spool means, as determined by said cartridge spool means sense means, with a predetermined tape quantity, said predetermined tape quantity representing the quantity of tape unwound from one revolution of a near empty cartridge spool means.

11. The apparatus of claim 10, further comprising:

(a) take-up hub sense means for sensing the revolutions of said take-up hub;

(b) said end-of-tape sense means senses the beginning of tape by comparing the quantity of tape unwound from the take-up hub for a revolution with a predetermined take-up hub quantity which represents the quantity of tape unwound from one revolution of a near empty take-up hub;

(c) said control means slowing down said first motor means in response to the approach of the beginning of tape as determined by the end-of-tape sense means.

12. The apparatus of claim 10 wherein:

(a) said cartridge receiving means further comprises cartridge moving means adapted for moving said cartridge between a first position and a second position, said cartridge first position allowing the insertion and removal of said cartridge from said cartridge receiving means, said cartridge second position causing said load block notch to matingly engage said load arm rod and said enlarged portion on said rod, said cartridge second position causing said locking means engaging means to engage and release said cartridge locking means;

(b) said locking means engaging means comprises a projection and an annular magnetic plate, with said projection projecting out of the center of said magnetic plate;

(c) said take-up hub has a channel which is adapted for matingly receiving said cartridge load block such that said rod is concentric with the axis of rotation of said take-up hub when said load arm is in the second position.

(a) said cartridge receiving means further comprises cartridge moving means adapted for moving said cartridge between a first position and a second position, said cartridge first position allowing the insertion and removal of said cartridge from said cartridge receiving means, said cartridge second position causing said load block notch to matingly engage said load arm rod and said enlarged portion on said rod, said cartridge second position causing said locking means engaging means to engage and release said cartridge locking means;

(b) said locking means engaging means comprises a projection and an annular magnetic plate, with said projection projecting out of the center of said magnetic plate;

(c) said take-up hub has a channel which is adapted for matingly receiving said cartridge load block such that said rod is concentric with the axis of rotation of said take-up hub when said load arm is in the second position.

13. The apparatus of claim 8 wherein:

(a) said cartridge receiving means further comprises cartridge moving means adapted for moving said cartridge between a first position and a second position, said cartridge first position allowing the insertion and removal of said cartridge from said cartridge receiving means, said cartridge second position causing said load block notch to matingly engage said load arm rod and said enlarged portion on said rod, said cartridge second position causing said locking means engaging means to engage and release said cartridge locking means;

(b) said locking means engaging means comprises a projection and an annular magnetic plate, with said projection projecting out of the center of said magnetic plate;

(c) said take-up hub has a channel which is adapted for matingly receiving said cartridge load block such that said rod is concentric with the axis of rotation of said take-up hub when said load arm is in the second position.

14. The apparatus of claim 6 wherein said cartridge receiving means further comprises cartridge moving means adapted for moving said cartridge between a first position and a second position, said cartridge first position allowing the insertion and removal of said cartridge from said cartridge receiving means, said cartridge second position causing said load block notch to matingly engage said load arm rod and said enlarged portion on said rod, said cartridge second position causing said locking means engaging means to engage and release said cartridge locking means.

15. The apparatus of claim 14 wherein said locking means engaging means comprises a projection and an annular magnetic plate, with said projection projecting out of the center of said magnetic plate.

16. The apparatus of claim 6 wherein said take-up hub has a channel which is adapted for matingly receiving said cartridge load block such that said rod is concentric with the axis of rotation of said take-up hub when said load arm is in the second position.

17. The apparatus of claim 6 wherein:

(a) said cartridge receiving means further comprises cartridge moving means adapted for moving said cartridge between a first position and a second position, said cartridge first position allowing the insertion and removal of said cartridge from said cartridge receiving means, said cartridge second position causing said load block notch to matingly engage said load arm rod and said enlarged portion on said rod, said cartridge second position causing said locking means engaging means to engage and release said cartridge locking means;

(b) said locking means engaging means comprises a projection and an annular magnetic plate, with said projection projecting out of the center of said magnetic plate;

(c) said take-up hub has a channel which is adapted for matingly receiving said cartridge load block such that said rod is concentric with the axis of rotation of said take-up hub when said load arm is in the second position.

18. The apparatus of claim 6, wherein:

(a) said tensioning means further comprises a spring loaded tension arm that contacts the tape;

(b) said wiper means comprises first and second tissue assemblies, with a tissue assembly being positioned on each side of said tape when said tape is strung to said take-up hub;

(c) one of said tissue assemblies has a movable arm around which tissue is wrapped, said movable arm contacting said tape when said tape is strung to said take-up hub;

(d) said tension arm and said tissue arm being movable between respective retracted positions and respective deployed positions, wherein with said respective arms in said respective deployed positions, said arms contact the tape and with said respective arms in said respective retracted positions said load arm can move between said load arm first and second positions.

* * * * *